US006692201B2

(12) United States Patent
Soderman

(10) Patent No.: US 6,692,201 B2
(45) Date of Patent: Feb. 17, 2004

(54) PORTABLE DRILL PRESS

(76) Inventor: Richard Soderman, 3024 Elm St., Bakersfield, CA (US) 93301

( * ) Notice: Subject to any disclaimer, the term of this patent is extended or adjusted under 35 U.S.C. 154(b) by 0 days.

(21) Appl. No.: 10/056,455

(22) Filed: Jan. 28, 2002

(65) Prior Publication Data

US 2003/0143041 A1 Jul. 31, 2003

(51) Int. Cl.[7] ............................................. B23B 45/14
(52) U.S. Cl. ........................ 408/111; 408/135; 408/712
(58) Field of Search ................................ 408/110, 111, 408/112, 113, 114, 135, 712

(56) References Cited

U.S. PATENT DOCUMENTS

| | | | | | |
|---|---|---|---|---|---|
| 2,261,746 | A | * | 11/1941 | Seaboly | 408/99 |
| 2,642,761 | A | * | 6/1953 | Goldberg | 408/99 |
| 2,737,065 | A | | 3/1956 | Piersall | 77/7 |
| 2,748,628 | A | | 6/1956 | Mason | 77/7 |
| 2,749,780 | A | | 6/1956 | Jones | 77/7 |
| 3,257,909 | A | * | 6/1966 | Henkel | 409/206 |
| 3,784,315 | A | | 1/1974 | O'Brien | 408/92 |
| 3,810,710 | A | * | 5/1974 | Ennemoser | 408/111 |
| 3,834,828 | A | | 9/1974 | Kikuchi | 408/92 |
| 4,284,373 | A | * | 8/1981 | Wolff | 408/87 |
| 4,375,931 | A | * | 3/1983 | Erdt | 408/234 |
| 4,468,159 | A | * | 8/1984 | Oster | 408/56 |
| 4,494,895 | A | | 1/1985 | Leaf | 408/236 |
| 4,541,759 | A | | 9/1985 | Miyoshi | 408/76 |
| 4,740,119 | A | | 4/1988 | Lierz | 408/111 |
| 5,007,776 | A | | 4/1991 | Shoji | 408/6 |
| 5,662,441 | A | * | 9/1997 | Wang | 409/185 |
| 5,885,036 | A | | 3/1999 | Wheeler | 408/1 R |

FOREIGN PATENT DOCUMENTS

| | | | | |
|---|---|---|---|---|
| DE | 2545197 | * | 4/1977 | 408/135 |
| DE | 2701358 | * | 7/1978 | 408/111 |
| DE | 2838565 | * | 3/1980 | 408/111 |

* cited by examiner

*Primary Examiner*—Daniel W. Howell
(74) *Attorney, Agent, or Firm*—Dennis W. Beech

(57) ABSTRACT

The portable drill press has a rack bar with a brace attached at one end. A pinion slide assembly is slidably engaged with the rack bar such that the pinion is in rotational engagement with a rack. The pinion slide assembly may be retained on the rack bar by a bolt. The pinion may be attached to a pinion shaft that may be rotated by a rotation lever. A mounting bracket may be attached to the pinion slide assembly for attachment of a hand drill. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

10 Claims, 1 Drawing Sheet

PORTABLE DRILL PRESS

BACKGROUND OF THE INVENTION

This invention relates to portable drill presses that may be transported to the location at which an object is to have a hole drilled therein. The new portable drill press uses a rack and pinion mechanism that a drill may be attached to for purposes of drilling a hole.

Portable drill press devices are known in the art. In general such devices use a pressure feed or friction/spring mechanism to move the drill with drill bit to engage an object for purposes of drilling a hole. Various devices may use movable jaws, pivoting rotational levers and handles, and the like to engage a drill with an object.

An alternative device may involve a magnet to retain the portable drill press on the object to be drilled. Such devices are known that allow use of the more conventional rack and pinion mechanism as may be found in more standard non-portable drill press machines.

It can be seen, there is a need for a simple rack and pinion portable drill press.

SUMMARY OF THE INVENTION

The present invention is directed to portable drill press devices having a rack bar with a brace attached at one end thereof. A pinion slide assembly is slidably engaged with the rack bar such that the pinion is in rotational engagement with a rack. The pinion slide assembly may be retained on the rack bar by a bolt. The pinion may be attached to a pinion shaft that may be rotated by a rotation lever. A mounting bracket may be attached to the pinion slide assembly for attachment of a hand drill.

These and other features, aspects and advantages of the present invention will become better understood with reference to the following drawings, description and claims.

DETAILED DESCRIPTION

The following detailed description is the best currently contemplated modes for carrying out the invention. The description is not to be taken in a limiting sense, but is made merely for the purpose of illustrating the general principles of the invention.

Figure 1:
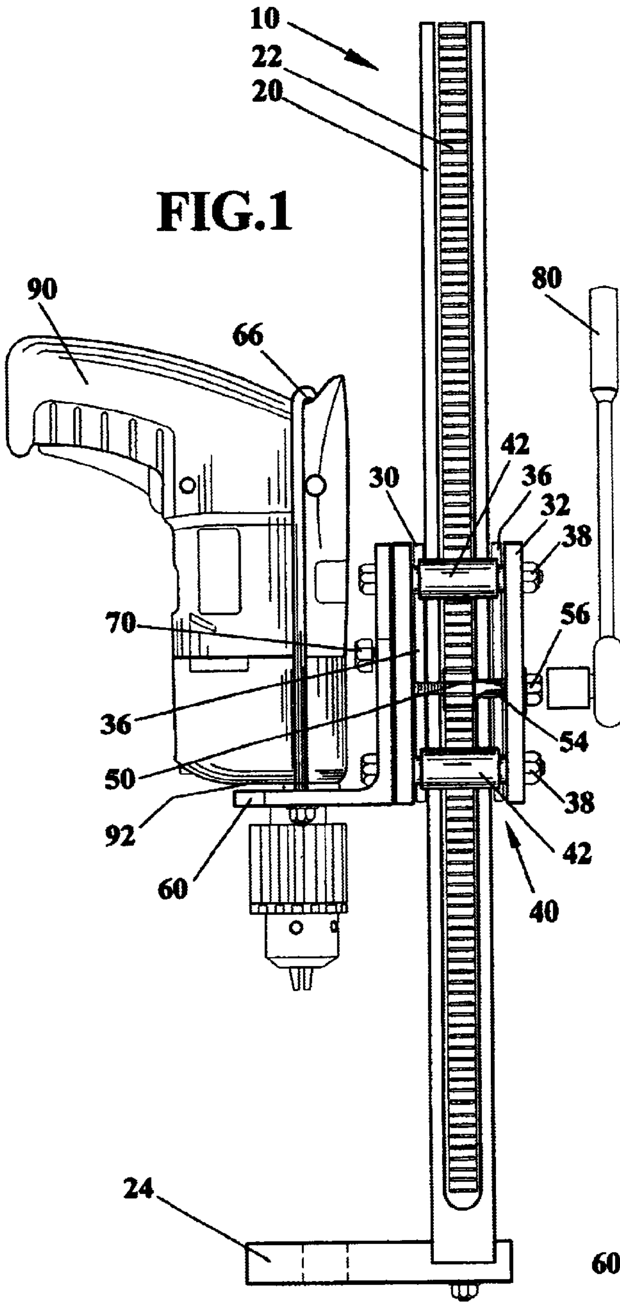
FIG. 1 illustrates a side elevation view of the portable drill press with hand drill attached.
Figure 2:
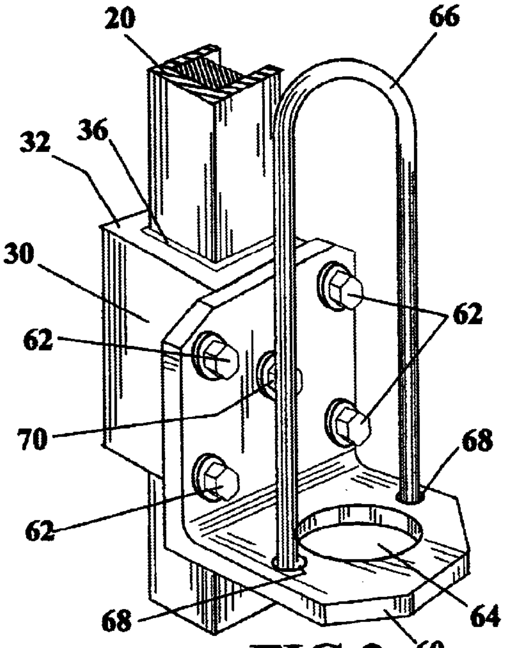
FIG. 2 illustrates a partial perspective view of the pinion slide assembly and rack bar according to an embodiment of the invention.

Referring to FIGS. 1 and 2, a portable drill press 10 may include a rack bar 20 with a rack 22 formed therein. A brace 24 may be attached at an end of the rack bar 20 by a bolt or other fastening method. A pinion slide assemble 30 may be slidably engaged with the rack bar 20 to allow pinion 50 to move in rack 22 with gear teeth 52 engaging the rack 22 elements.

The pinion slide assembly 30 may have a slide element 32, may be of a generally U-shape metal construction and may have a U-shape sliding bearing 36, formed of plastic or other suitable low friction material, inserted therein and attached to provide a relatively low friction surface for engagement with the rack bar 20 that may be of metal construction. For a lightweight portable drill press, aluminum may be used for the rack bar 20 with the rack 22 formed within the rack bar 20 by for example machining. The use of a rack bar 20 and simple brace 24 may allow the portable drill press 10 to be used in difficult to access locations.

The pinion slide assembly 30 may be slidably retained on the rack bar 20 by bolts 38 attached across the open portion 40 of the slide element 32. Washer sleeves 42 may be rotationally inserted over bolts 38 to facilitate movement of the pinion slide assembly 30 on the rack bar 20. The washer sleeves 42 may be made of plastic, metal or other suitable material.

The pinion 50 may be mounted on pinion shaft 54 and may have a bolt head 56 exterior to the slide element 32 for engagement of the pinion 50 with the rack 22. Bushings (not shown) may be used on the pinion shaft 54 at the point of engagement with the slide element 32. A ratchet device 80 may be used to move the pinion slide assembly 30 along the rack bar 20 by engagement with bolt head 56. While a bolt head 56 and ratchet device 80 are illustrated, it can be understood that other known mechanisms may be used, for example, the bolt head 56 may be replaced with a shaft end having an orthogonal hole therethrough through which a lever dowel may be inserted for use in rotating the pinion 50. Other examples of rotation lever mechanisms are known in the art.

Figure 3:
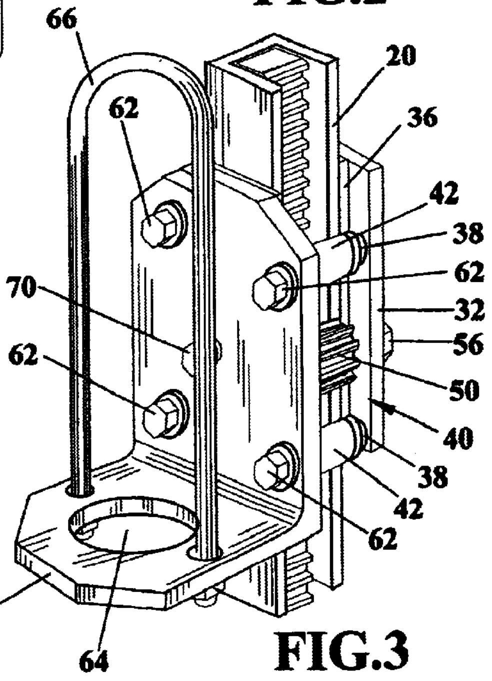
FIG. 3 illustrates a partial perspective view of the rack bar, slide assembly and mounting bracket according to an embodiment of the invention.

Referring to FIGS. 1 and 3, a mounting bracket 60 may be attached to the slide element 32 by for example fastening bolts 62. The mounting bracket 60 may be attached to the pinion slide assembly 30 to be positioned at approximately a 90 degree angle relative to the rack 22 front face. The general L-shaped bracket 60 may have an aperture 64 formed therein for receipt of the drill chuck end 2 of a hand drill 90. The hand drill 90 may then be fastened by U-bolt 66 to mounting bracket 60. The orientation of the hand drill 90 may be adjusted by an adjustment bolt 70. The adjustment bolt 70 may be rotated to position the head the desired distance from the mounting bracket 60 to properly position the hand drill 90 for drilling. The U-bolt holes 68 may be located to allow rotation of the hand drill 90, for example, 90 degrees from that illustrated in FIG. 1. Also, plate adapters (not shown) may be inserted over aperture 64 to reduce the size thereof to accommodate different size hand drills 90.

A simple brace 24 is illustrated in FIG. 1. It would be obvious to those skilled in the art that many configurations of a brace may be used depending on the drilling application requirements. Also, adapters may be used to extend the mounting bracket 60 orthogonally away from the pinion slide assembly 30.

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A portable drill press comprising:

a rack bar having a rack therein and a brace attached at an end thereof;

a pinion slide assembly slidably engaged with said rack bar wherein a pinion is in rotational engagement with said rack;

said pinion slide assembly slidably retained on said rack bar by a bolt wherein a washer sleeve is retained around said bolt;

said pinion attached to a pinion shaft that is rotatable by a rotation lever;

a mounting bracket attached to said pinion slide assembly for attachment of a hand drill.

2. The portable drill press as in claim 1 wherein said pinion slide assembly comprising a slide element having an open portion therein across which said bolt are attached.

3. The portable drill press as in claim 2 wherein there is a slide bearing fastened in said slide element.

4. The portable drill press as in claim 1 wherein said mounting bracket is attached to said pinion slide assembly to be positioned at approximately a 90 degree angle relative to said rack front face.

5. The portable drill press as in claim 1 wherein there are two bolts.

6. The portable drill press as in claim 1 wherein said pinion shaft having a bolt head for engagement with said rotation lever.

7. The portable drill press as in claim 6 wherein said rotation lever is a ratchet device.

8. The portable drill press as in claim 1 wherein the mounting bracket comprising a generally L-shape bracket having an aperture formed therein for receipt of a drill chuck end of said hand drill and said L-shape bracket having a pair of bolt holes therein for engagement of a U-bolt.

9. The portable drill press as in claim 8 wherein a plate adapter is attached to reduce the size of said aperture.

10. The portable drill press as in claim 8 wherein there is an adjustment bolt threadably engaged with said L-shape bracket.

* * * * *